US005198974A

United States Patent [19]

Orsat

[11] Patent Number: 5,198,974

[45] Date of Patent: Mar. 30, 1993

[54] SAFETY DEVICE FOR MOTORIZED ROLLING SHUTTER

[75] Inventor: Jean-Michel Orsat, Cluses, France

[73] Assignee: Somfy, Cluses, France

[21] Appl. No.: 644,543

[22] Filed: Jan. 23, 1991

[30] Foreign Application Priority Data

Jan. 26, 1990 [FR] France ................................ 90 00939
Sep. 3, 1990 [FR] France ................................ 90 10936

[51] Int. Cl.5 ........................ G06F 15/20; E05F 15/10

[52] U.S. Cl. ................................ 364/167.01; 364/178; 318/636; 318/466; 49/28; 160/133; 160/310

[58] Field of Search .................... 364/148, 167.01, 178, 364/179; 318/466, 467, 636; 160/133, 188, 309, 310, 311, 1; 49/26, 28

[56] References Cited

U.S. PATENT DOCUMENTS

| | | | |
|---|---|---|---|
| 4,383,206 | 5/1983 | Matsuoka et al. | 318/445 |
| 4,665,965 | 5/1987 | Pasquier et al. | 160/310 |
| 4,690,195 | 9/1987 | Taylor | 160/310 |
| 4,831,509 | 5/1989 | Jones et al. | 364/167.01 |
| 4,953,608 | 9/1990 | Larsson | 160/1 |

FOREIGN PATENT DOCUMENTS

| | | |
|---|---|---|
| 558455 | 1/1987 | Australia . |
| 2503238 | 7/1976 | Fed. Rep. of Germany . |

*Primary Examiner*—Jerry Smith
*Assistant Examiner*—Paul Gordon
*Attorney, Agent, or Firm*—Laff, Whitesel, Conte & Saret

[57] ABSTRACT

Safety device for motorized rolling shutter comprising a generator of a signal representing the displacement of the rolling shutter and a logic processing unit (10) capable of working in learning mode and in operating mode for recording and processing signal samples and for comparing the values obtained in operating mode with the values obtained in learning mode in order to control the stopping of the motor (5) of the rolling shutter when there is an obstacle and for providing, if necessary, other functions such as the automatic stopping in the high position and in the low position, or the triggering of an alarm. The generator comprises a pulley on which is wound a flexible element (9) whose other end is connected to the end (8) of the rolling shutter, such that the unrolling of the rolling shutter (1) drives the pulley whose axis is mechanically connected to a signal generator, for example a synchronous motor.

22 Claims, 11 Drawing Sheets

SAFETY DEVICE FOR MOTORIZED ROLLING SHUTTER

FIELD OF THE INVENTION

The invention or similar relates to a safety device for a motorized rolling shutter comprising means supplying an electrical signal representing the displacement of the rolling shutter and a logic processing unit capable of working in learning mode and in operating mode, by sampling, and comprising means of storing, in learning mode, value samples corresponding to the signal samples and means of comparing, in operating mode, these stored value samples with the value samples obtained in operating mode, and means of controlling the stopping of the motor of the rolling shutter when the difference between the value of the sample obtained in operating mode and the value of the stored sample is greater than a predetermined difference.

Rolling shutter refers to any closing element which can be rolled up, that is to say as much to an element formed from mutually hinged slats as to a sheet or similar.

PRIOR ART

A device of this type is described in U.S. Pat. No. 4,831,509 for controlling a door of the type which can be rolled up. In this device, the signal representing the displacement of the door is obtained by means of a position encoder coupled to the winding drum on which the door is rolled and optoelectronic sensors placed on the trajectory of the door and detecting the passage of references, in particular of particular slats, and sending pulses to the encoder each time a reference passes. The signal supplied by the encoder is used by a microprocessor which proceeds by sampling the travel divided into segments and into sectors in order to determine changes in speed over the sectors of the travel of the door. When the change of speed measured in a sector is outside fixed limits, the device concludes that there is an obstacle, stops the motor and reverses its running direction. This device has various disadvantages. In particular it is essential for the encoder to be on the spindle of the winding drum or coupled to this spindle, which is not always possible because of lack of space. The sensors must be placed in the immediate vicinity of the rolling door on which the references are placed and as close as possible to these references, which is difficult since, because of the manufacturing technique used, the displacement of the rolling door is not always very rectilinear. With regard to the references, they must be located on the door itself and, considering their exposure, they are subject to degradation and dirtying, which is harmful to the correct functioning of the device and consequently to safety. Furthermore, the electrical connection must be comfortably protected. This prior device furthermore requires that the automatic "high" stop point, that is to say the "rolled" point, is precise, since it is from this point that the device successively establishes, displacement sector after displacement sector, that is to say during unrolling, the changes in average speed which will then be compared with the changes of speed measured in operating mode. If the "high" stop point moves, the measured speeds also shift and the comparisons are falsified, which is harmful to the fidelity of the device. It can furthermore be noted that the program associated with this device owes its complexity to the routines necessary for the continuous adaptation of reference speed characteristics. Finally, the result obtained by this prior device is not satisfactory if applied to rolling shutters with perforated telescopic slats, which is in the case of most domestic rolling shutters. In fact, in this case, as it is essential for the sensor to be located close to the winding spindle, the device can only detect an obstacle when the slats located under the sensor are tightly stacked, that is to say when the obstacle supports the entire weight of the slats located under the sensor.

SUMMARY OF THE INVENTION

The purpose of the present invention is to produce a device overcoming the disadvantages of the known device, and more particularly a device which is easy to put into use and requiring no or very few fittings on the shutter itself, particularly no precise mechanical parts which are difficult to install. The device must operate reliably whatever the environment and conditions of use.

The invention proposes a safety device wherein the means supplying the electrical signal representing the displacement of the rolling shutter comprise a pulley on which is wound a flexible element whose free end is connected to the end of the rolling shutter such that the unrolling of the rolling shutter causes the unrolling of the flexible element, an elastic means ensuring the rewinding of the flexible element on its pulley during the rolling of the rolling shutter and a signal generator mechanically connected to the spindle of the pulley and supplying an electrical voltage representing the speed of rotation of the pulley, and wherein the logic processing unit comprises means of sampling the electrical signal supplied by the signal generator.

The electrical signal supplied by the signal generator mechanically connected to the spindle of the pulley must simply allow the immediate detection of a sudden and large variation in the speed of rotation of the pulley during the lowering of the rolling shutter. This signal generator can therefore be of various types, provided that it transmits information representing this sudden difference. A Hall effect sensor is preferably used, for example a synchronous motor used as a generator. Among other types of sensor, it is possible to use, for example, a strain gage combined with a spring which is progressively tightened by the rotation of the pulley.

The samples stored in learning mode, measured and compared, can be of different types. For example, it is possible to compare the speed variations between two successive measurements ($\Delta v$) or to compare the successive speed measurements, it being considered satisfactory to stop the motor when the measured speed is substantially equal to 0, while the speed stored in learning mode for the corresponding instant is still different from 0, or, by a reading of successive speeds, to compute the average slope of the speed curve between the high and low positions of the rolling shutter and, this average slope being stored, to measure and compute, in operating mode, the speed variations ($\Delta v$) between two successive measurements and to compare them with the average slope, the motor being stopped when the difference is very large, which indicates that the rolling shutter has encountered an obstacle which has greatly slowed it down if not stopped it.

BRIEF DESCRIPTION OF THE DRAWINGS

The invention will be better understood by the description of exemplary embodiments described with reference to the appended drawings in which.

DESCRIPTION OF THE PREFERRED EMBODIMENTS

Figure 1:
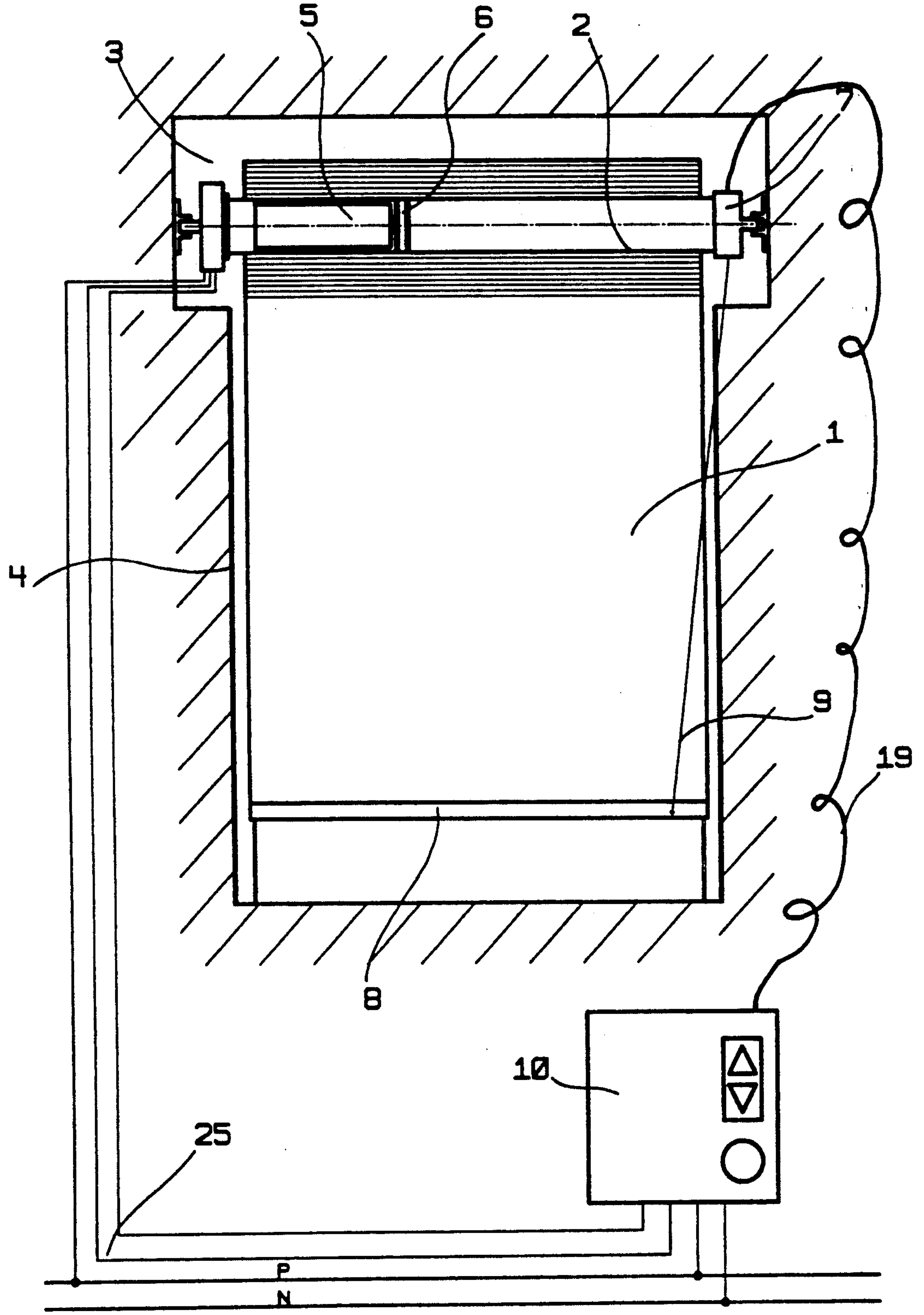
FIG. 1 is an overall view of an installation comprising a shutter and a safety device.

FIG. 1 is a diagrammatic representation of an installation comprising a rolling shutter 1, formed from juxtaposed transverse slats and rolling up on a motorized winding tube 2 mounted in the upper section 3 of a window embrasure 4. The winding tube 2 is driven by a motor reduction gear 5 such as described for example in the patents FR 2, 480, 846 and 2, 376, 285. The motor reduction gear 5 is mounted inside the winding tube 2 and drives the latter by means of a pulley 6 which is integral with the winding tube 2. These winding means are fitted, in a known way, with an auxiliary high and low stop device. At one of the ends of the winding tube 2 is mounted a sensor 7 connected to the lower slat 8 of the rolling shutter 1 by a flexible element 9 such as a string. The installation furthermore comprises an electronic control unit 10.

Figure 3:
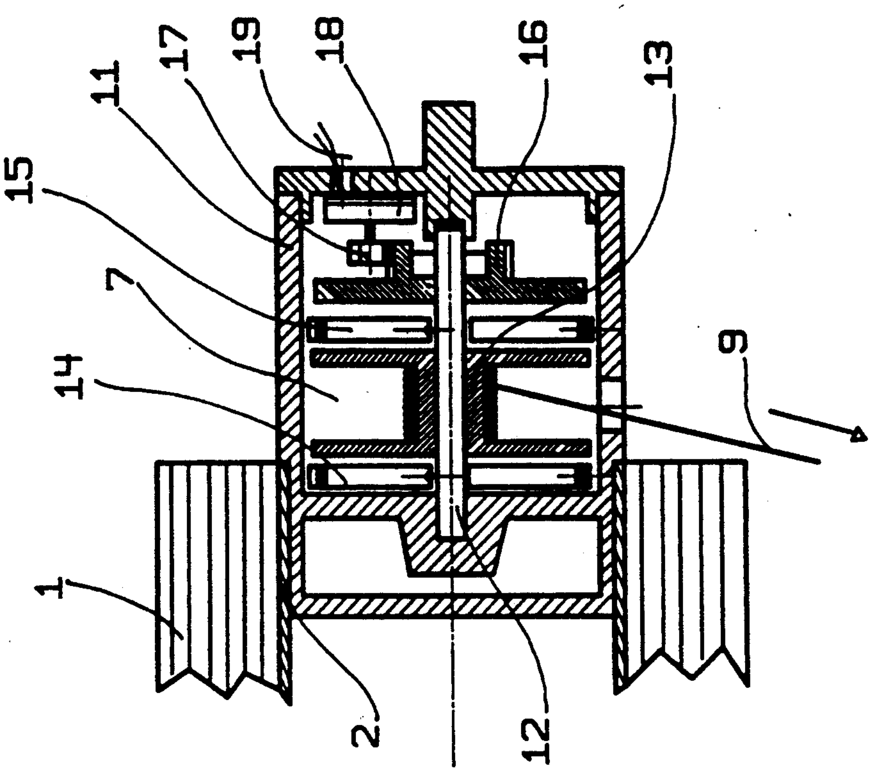
FIG. 3 shows the pulley and the signal generator according to a first embodiment.

A first embodiment of the sensor 7 is shown in FIG. 3. It is formed from a casing 11 mounted at the end of the winding tube 2 and containing: a shaft 12 freely mounted in the casing, a pulley 13 fixed to the shaft 12 and on which the string 9 winds, and two flat spiral springs 14 and 15, disposed on each side of the pulley 13, each of which has one end fixed to the shaft 12 and the other end fixed to the casing 11. On the shaft 12 there is furthermore fixed a toothed wheel 16 engaging with a pinion 17 integral with the shaft of a small synchronous motor 18 constituting a signal generator. The motor 18 is connected by two wires 19 to the electronic unit 10. The springs 14 and 15 are return springs whose function is rotate the shaft 12 in order to rewind the string 9 on the pulley 13 during the raising of the rolling shutter 1. The two springs 14 and 15 have the same function, a single spring would be sufficient. During the unrolling of the rolling shutter 1, the string 9 therefore has the effect of driving the pulley 13 and consequently the synchronous motor 18, multiplying the speed of rotation of the winding tube 2.

Figure 2:
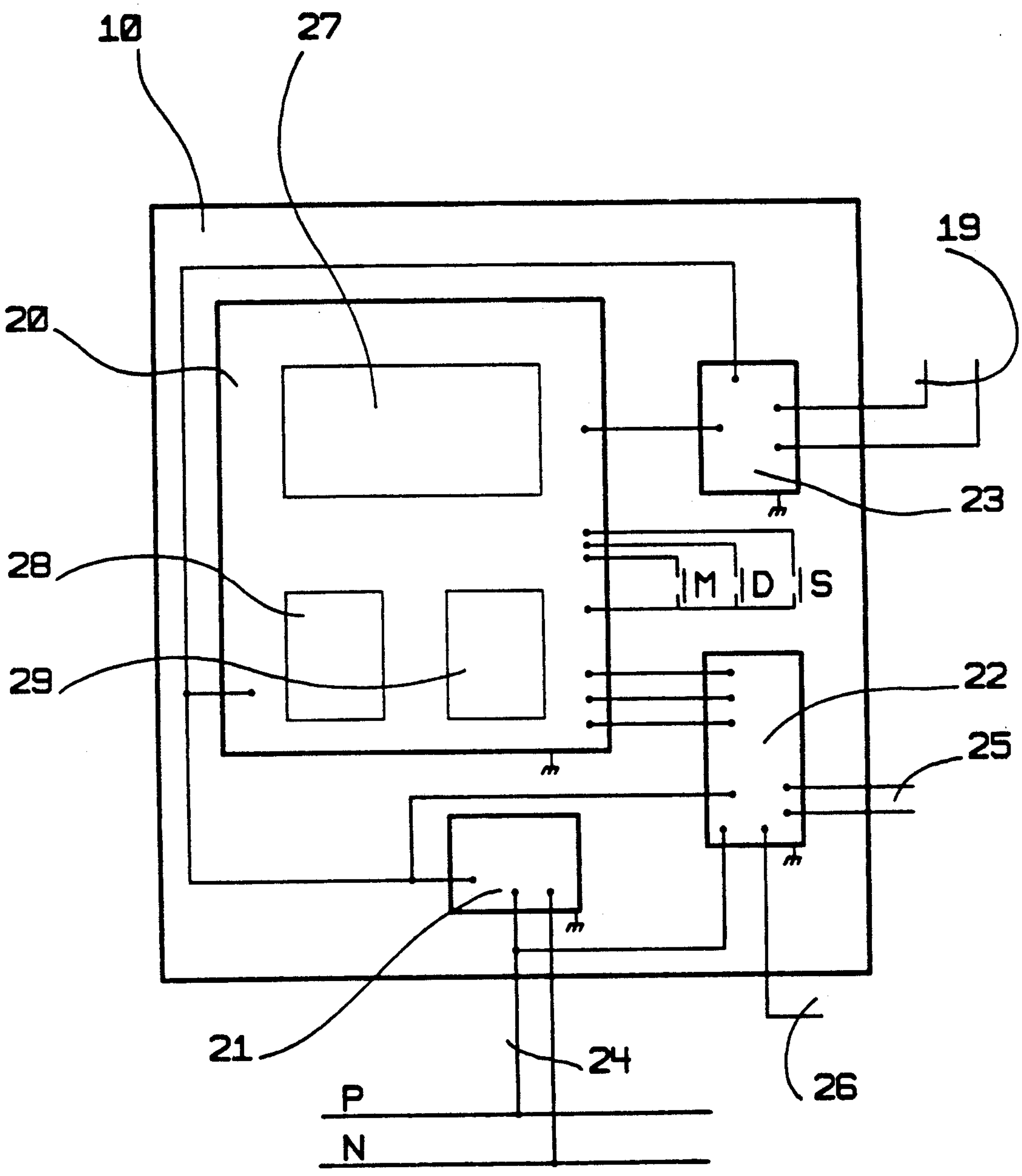
FIG. 2 shows the block diagram of the electronic unit of the safety device.

The electronic unit 10, shown diagrammatically in FIG. 2, comprises a logic processing unit (LPU) 20, a stabilized power supply 21, an output interface 22, an analog/digital converter 23, contacts for raising M, lowering D and mode selection S, the two-wire input 19 connected to the sensor 7, a two-wire input 24 connected to the power supply P/N, a two-wire output 25 connected to the motor reduction gear 5 and a single-wire output 26 connected to an alarm. The interconnections between the various listed components are made according to the diagram shown in FIG. 2 and will not be described in detail. The stabilized power supply 21 is provided for supplying a stabilized power supply TBT to the analog/digital converter 23, to the output interface 22 and to the LPU 20. The A/D converter 23 is provided for converting the analog signal coming from the sensor 7 into a digital signal. The output interface 22 is provided for supplying power to the motor reduction gear 5, and to an alarm responding to commands coming from the ULT 20.

The LPU 20 is constituted by a computer 27, for example the MOTOROLA 8051, a random access memory (RAM) 28 and an electrically erasable read only memory (EEPROM) 29.

The EEPROM memory 29 contains memory locations for storing, in learning mode, the values of the signals received from the sensor 7 and read when the rolling shutter 1 is subjected to a lowering command, and the value of the average slope computed between the last value read and the first value read (PMA).

The RAM memory 28 contains memory locations for storing, in operating mode, the values of the signals coming from the sensor 7 and read when the rolling shutter is subjected to a lowering command and, if necessary, the value of the variation of the slope of the curve of the values between the last value read and the first value read (PMU).

The computer 27 comprises a non-volatile memory containing memory locations in which are recorded the safety program, the maximum accepted difference k1 between the elementary slope PEU computed in operating mode and the average slope PMA computed in learning mode, of the values curve, Raising/Lowering subroutines which can be activated by the Raising/-Lowering contacts M and D, and Stop plus raise again and Alarm subroutines which can be activated by the safety program. These subroutines have the effect of activating the corresponding outputs of the computer 27 and, by means of the output interface 22, controlling the lowering, raising, stopping and the raising of the rolling shutter 1 again or of controlling the triggering of an alarm.

The LPU 20 is programmed to work in two modes, one known as the learning mode and the other known as the operating mode, and to sample, that is say sequentially and repetitively, when the rolling shutter is subjected to a lowering command: to read two successive values of the signals supplied by the signal generator 18; to compute the elementary slope of the curve of the signal corresponding to the variation between these two values; to store the signal values when the slope is different from 0 in learning mode.

In learning mode, when the computed elementary slope is equal to 0, the LPU 20 is programmed to compute the average slope corresponding to the variation between the first stored value and the last stored value.

When the central processing unit is in operating mode, the elementary slope between two values differing by a value greater than a predetermined value of the average slope computed in learning mode, the ULT 20 is programmed to activate a subroutine for stopping and raising the rolling shutter again if the last signal value recorded at that instant is different from the last signal value recorded in learning mode.

Figure 4:
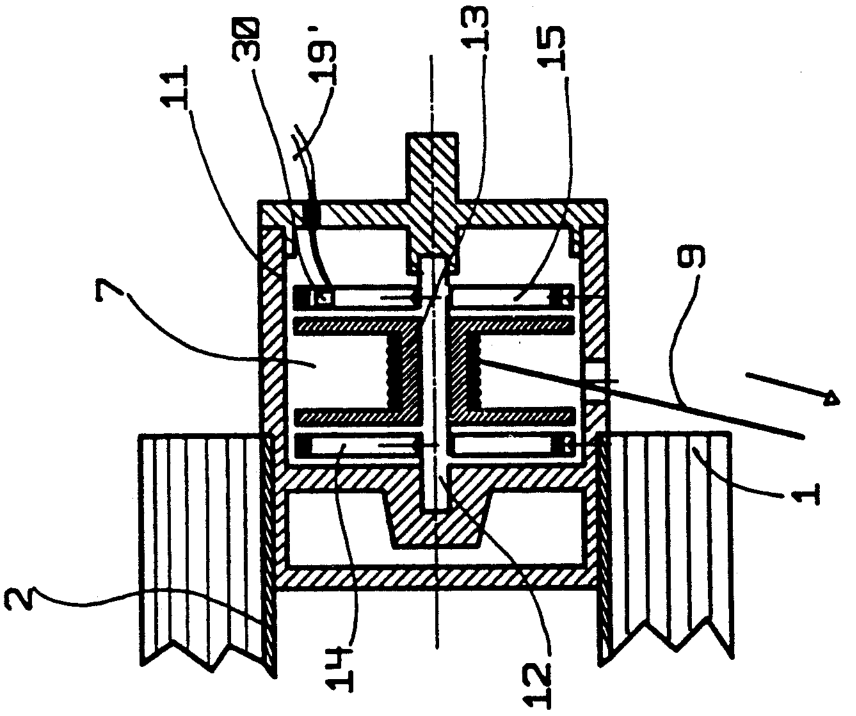
FIG. 4 shows the pulley and the signal generator according to a second embodiment.

Before proceeding with the description of the safety program, a variant embodiment of the sensor 7 shown in FIG. 4 will be described. In this variant embodiment, the pulley 13 mounted on its shaft 12 between its two springs 14 and 15 is found again. The signal generator is here constituted by a strain gage 30 associated with the spring 15 and measuring the mechanical tension of this spring 15. This strain gage 30 is connected by a four-wire line 19, to the control unit 10, two wires coming from the stabilized power supply 21 and the other two wires being connected to the A/D converter 23.

A first embodiment of the safety program will now be described with reference to FIG. 5. The signal generator is in principle a synchronous motor. The safety program comprises the sequence of the following instructions:

31 is an instruction polling the Raising/Lowering contacts of the electronic unit 10;

32 and 33 are instructions for testing that the Raising and Lowering contacts respectively of the electronic unit are activated;

34 and 50 are instructions for activating the Lowering and Raising subroutines respectively of the rolling shutter 1;

35 is an instruction for testing that the mode selector S is in the learning mode;

36 is an instruction for reading two values of the signal from the sensor 7;

37 is an instruction for computing the elementary slope PEA between two successive values read in 36;

38 is an instruction for testing that PEA=0;

39 is an instruction for storing the values read;

40 is an instruction for computing the average slope PMA corresponding to the variation between the last and first values stored in 39;

41 is an instruction for storing the PMA;

42 is an instruction for putting into operating mode;

43, 44 are instructions similar to 36 and 37 (elementary slope PEU);

45 is an instruction for testing that the elementary slope PEU (in operating mode) differs by a value less than a value determined by k1 from the average slope PMA;

46 is an instruction for storing the values read in 43 in the RAM memory;

47 is an instruction for comparing the last value stored in 43 and the last value stored in 39;

48 is an instruction for testing that the two values compared in 47 are equal;

49 is an instruction for activating the subroutine for stopping and raising the rolling shutter 1 again.

Operation in calibration mode:

The rolling shutter 1 is wound to the stop point 0. The low stop point of the auxiliary automatic stop device is adjusted such that the final slat 8 of the rolling shutter rests on the base of the embrasure 4 of the window.

In order to abbreviate the description, the program will be denoted by PRG and the subroutines by SPRG.

In the absence of movement, the safety PRG runs and instruction 31 polls the contacts M/D; instructions 32 and 35 test that none of these contacts is activated, then the PRG loops back to instruction 31. The rolling shutter 1 remaining immobile, the signal generator 18 does not supply any signals. In order to proceed with the calibration, the user activates the mode selector contact S, then activates the Lowering contact D. Instruction 33 tests that the Lowering contact D is activated; instruction 34 activates the lowering SPRG which causes the unwinding of the rolling shutter 1. The latter moves downwards and pulls, by means of its slat 8, the string 9 connected to the pulley 13 which, in its turn, drives the synchronous motor 18 which then supplies an electrical voltage as a function of the speed of rotation of the pulley 13. The motor reduction gear 5 having a constant speed and the winding diameter decreasing with the unwinding, the linear lowering speed of the rolling shutter 1 decreases with the unwinding and the speed of rotation of the pulley 13 also decreases regularly such that the electrical signal supplied by the synchronous motor 18 also decreases regularly, the slope between the measured successive values of the successive signal being substantially constant, but different from 0.

Instruction 35 tests that the LPU 20 is in learning mode; instruction 36 reads two successive values of the signal, then instruction 37 computes the elementary slope PEA between two successive values of the signal.

Instruction 38 tests that PEA is different from 0, which is the case throughout the lowering of the rolling shutter 1 because, in learning mode, it is ensured that nothing interferes with this lowering. Instruction 39 then stores the corresponding signal values in EEPROM. Instructions 36, 37, 38 and 39 are repeated until instruction 38 tests that PEA =0, which is the case when the final slat 8 rests on the base of the window opening.

Instruction 40 then computes the average slope PMA corresponding to the total variation of the value of the signal between the first value and the last value stored 39 in EEPROM, then instruction 41 stores this average slope, also in EEPROM. Instruction 42 switches the device into operating mode, then the safety PRG loops back to instruction 31.

At this instant, in the EEPROM memory, are stored all of the signal values read since the start of the unwinding of the rolling shutter 1 at the high stop point until the final slat 8 is stopped on the base of the opening 4. These values being regularly decreasing, the slope PEA between two successive values is substantially equal to the average slope PMA between the first and last values read.

Functioning of the device in operating mode:

The user controls the winding of the rolling shutter 1 up to its high stop point by activating the Raising contact M. The safety PRG, by instruction 32, tests that the contact M is activated and then, by instruction 50, activates the Raising SPRG which causes the raising of the rolling shutter 1 again until the automatic stop device of the winding means acts in order to stop it at the high stop point.

The user then actuates the Lowering contact D. The safety PRG runs as before until instruction 35 which then tests that the LPU 20 is in operating mode. Instruction 43 reads two signal values supplied by the generator 18 and then computes the elementary slope in operating mode PEU. Instruction 45 tests that the difference between PEU and PEA is less than k1. PEA, then instruction 46 stores the signal values corresponding to this slope.

As long as there are no obstacles on the trajectory of the rolling shutter 1, the difference between PEU and PEA remains less than k1. PEA and the instructions 43, 44, 45 and 46 are repeated.

If an obstacle interferes with the lowering of the rolling shutter 1, the final slat 8 is slowed down, causing, by means of the string 9 and the pulley 13, a reduction in the signal supplied by the generator 18. The value of the elementary slope PEU differs from the average slope PMA and instruction 45 calls instruction 47 which then tests that the last signal value stored at that instant (VUT) is different from the last signal value stored in learning mode (VAP). This test differentiates between a reduction in the signal which appears during the lowering of the rolling shutter and which is caused by an obstacle and that which appears when the final slat 8 comes into contact with the base of the opening of the window.

If VUT is different from VAP, instruction 48 calls instruction 49 which activates the SPRG for stopping and raising the rolling shutter again. If the final slat 8 reaches the base, instruction 48 tests that VUT is equal to VAP and the safety PRG loops back to instruction 31 and the automatic stop device of the winding means ensures that the rolling shutter stops at its low stop point.

In the functional description which has just been given, it has been considered that the signal generator was a synchronous motor 18. In the case in which the signal generator is constituted by the strain gage 30, as the spring 15, fitted with the gage 30 receives an initial priming, the value of the signal supplied by the strain gage 30 is always different from 0. When stopped, as the stress of the spring 15 does not change, the signal is therefore constant whereas in motion, as the speed of rotation of the pulley 13 is regularly decreasing, the curve of the spring 15 is substantially linear and the signal increases regularly. The result of this is that, as in the previous mode, the slope of the signal is zero when stopped and substantially constant and equal to the average slope in motion. The functioning of the device is therefore identical to the described functioning.

It is possible to take advantage of the presence of a ULT in order to allocate additional functions to it, particularly all or some of the functions provided by the automatic end of travel stop device of the winding means. It is thus possible to program the LPU 20 to activate a SPRG for stopping the rolling shutter in the low position. This stopping SPRG is activated, in learning mode, if the elementary slope of the curve of the measured values is equal to 0 and, in operating mode, if the elementary slope differs by a value greater than a predetermined value from the average slope computed in learning mode and if the last value read in operating mode is equal to the last value read in learning mode. For this purpose, the flowchart of the program of FIG. 5 is completed, as shown in FIG. 6, by the instructions for activating the SPRG for stopping the rolling shutter 51 and 52, the figures appearing above and below these instructions corresponding to the instructions of FIG. 5 to which these instructions are connected. The safety program then differs from the preceding mode after the instructions 41 and 48. After these instructions, the rolling shutter 1 is at the bottom of the opening. Instructions 51 and 52 activate the SPRG for stopping the rolling shutter which stops at the bottom of the opening.

Figure 7:
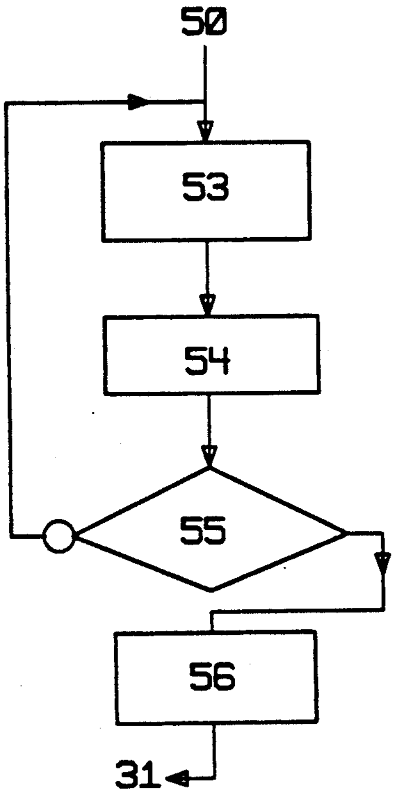
FIG. 7 shows a second addition to the program of FIG. 5 comprising instructions for stopping the motor during the raising and in the high position.

The ULT 20 can furthermore be programmed to ensure the stopping of the rolling shutter in the rolled-up high position. For this purpose, the LPU 20 is programmed to, sequentially and repetitively, read two signal values of the sensor 7, compute the elementary slope of the curve of the measured values corresponding to the variation between these two values and activate the SPRG for stopping the motor if this elementary slope differs by more than a predetermined value from the average slope computed in learning mode, which indicates in principle that the shutter is in the high position. During the raising, it is considered that there are no obstacles and consequently a variation indicates that the shutter is in the high position. This is therefore the only possibility foreseen by the LPU. It is not necessary to make a distinction between and obstacle and a complete rolling-up. The addition to the flowchart of FIG. 5 is shown in FIG. 7. The safety PRG is completed by instructions 53 to 56. Instruction 53 is an instruction for reading two signal values from the sensor. Instruction 54 is an instruction for computing the slope p between two successive values read in 53. Instruction 55 is an instruction for testing that the slope p differs by a value greater than a value determined by k1 from PMA. Instruction 56 is an instruction for activating the SPRG for stopping the rolling shutter. When the Raising SPRG is activated by instruction 50, the rolling shutter rises and instructions 53, 54, and 55 run sequentially and repetitively as long as instruction 55 tests that p is substantially equal to PMA.

When the rolling shutter arrives at the stop in the upper section of the opening, it is slowed down and instruction 55 tests that p differs from the average slope PMA and it calls instruction 56 which activates the SPRG for stopping the rolling shutter.

This variant, in combination with the previous one, allows the elimination of the auxiliary automatic stop device. It also allows the protection of the rolling shutter during its raising, if an obstacle should interfere with its movement.

Figure 8:
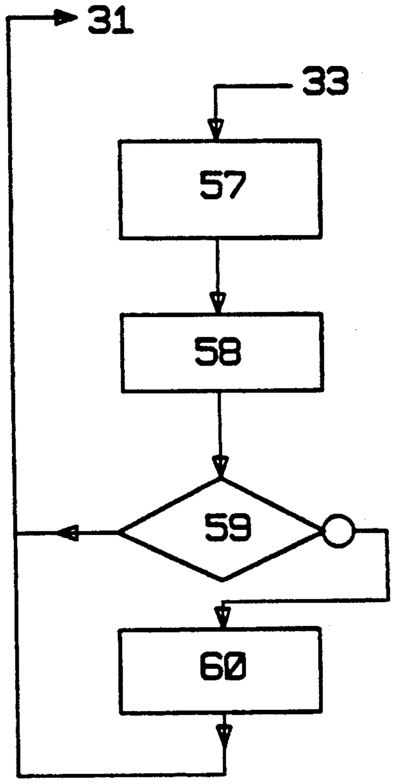
FIG. 8 shows an third addition to the program of FIG. 5 comprising instructions for triggering an alarm.

The LPU 20 can also be programmed to trigger an alarm in the case in which the rolling shutter is not subjected to any movement command, for example in the case of an attempted break-in. For this purpose the LPU 20 is programmed to, sequentially and repetitively, read two signal values from the sensor, compute the elementary slope corresponding to the variation between these two values and actuate an alarm subroutine SPRG in the case in which this slope is different from 0. The addition to the flowchart of FIG. 5 is shown in FIG. 8. Instruction 57 is an instruction for reading two signal values from the sensor. Instruction 58 is an instruction for computing the slope p between two successive values read in 57. Instruction 59 is an instruction which tests that the slope is equal to 0. Instruction 60 is an instruction for activating the alarm SPRG.

These instructions are activated when called by the test instruction 33 in the case in which the rolling shutter is not subjected to any command. Instructions 57, 58 and 59 run sequentially and repetitively as long as the slope of the curve of the speed values is equal to 0, that is to say as long as the rolling shutter is not moving. As soon as there is a movement of the rolling shutter, instruction 59 tests a slope different from 0 and calls, at this instant, instruction 60 which activates the alarm SPRG.

In one or other of the preceding embodiments, the ULT 20 can furthermore be programmed, in the case in which the last signal value recorded is equal to the last signal value recorded in learning mode, to compute the average slope of the signal value received in this operating phase and to replace the average speed computed in learning mode and the corresponding signal values, with the new average slope and the corresponding signal values, if this new average slope differs by more than a predetermined value from the average slope computed in learning mode. This correction may be necessary in order to take account of the wearing and aging of the installation. The correction is automatic and the check is performed during each travel .

Figure 9:
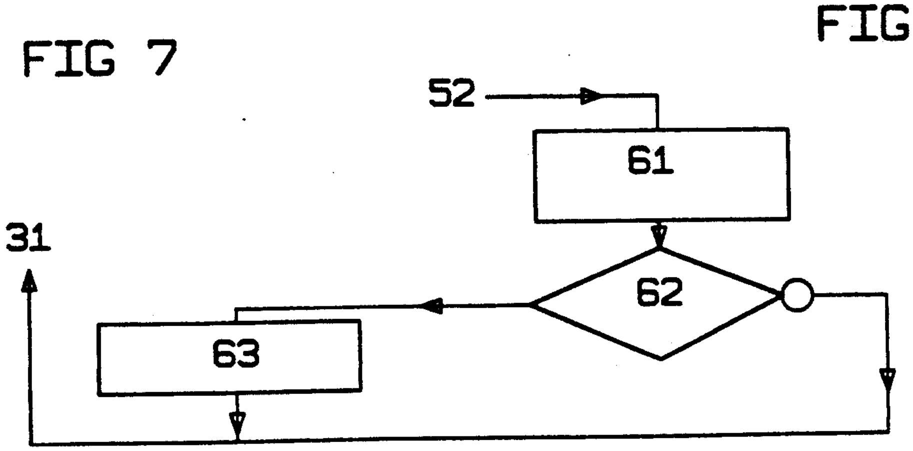
FIG. 9 shows a fourth addition to the program of FIG. 5, intended to replace the stored average slope with a new average slope measured in operating mode, if a predetermined difference is measured.

For this purpose, the safety program is completed by instructions 61, 62 and 63 as shown in FIG. 9. Furthermore, the central memory of the LPU 20 contains, in addition to the value of the difference k1, the value of the difference k2 accepted between the slope computed in learning mode PMA and the slope computed in operating mode PMU. Instruction 61 is an instruction for computing the average slope PMU corresponding to the variation between the last and first values stored by instruction 46 in the RAM memory. Instruction 62 is an instruction for testing that the slope PMU differs by a value less than a value determined by k2 from the slope PMA. Instruction 63 is an instruction carrying out the transfer of the value of the slope PMU and the corresponding signal values stored in RAM into the EEPROM memory by replacing the average slope computed in learning mode and the corresponding signal values.

The functioning of this variant differs from the functioning of the preceding modes in that instruction 52, activating the SPRG for stopping the motor after a normal lowering of the rolling shutter from its high stop point, calls instruction 61 which computes the average slope PMU between the first and last signal values stored in RAM during the lowering. Instruction 62 tests that this slope does not differ by more than a value determined by k2 from the value PMA. In this case it loops back to instruction 31. In the opposite case, it calls instruction 63 which replaces the signal values stored in learning mode, and the corresponding average slope PMA, with the new signal values stored in RAM memory during the lowering, and the corresponding computed slope PMU. Thus the changes due to friction, wear of the mechanism, etc., are automatically taken into account and the device retains its accuracy in the course of time.

Figure 10:
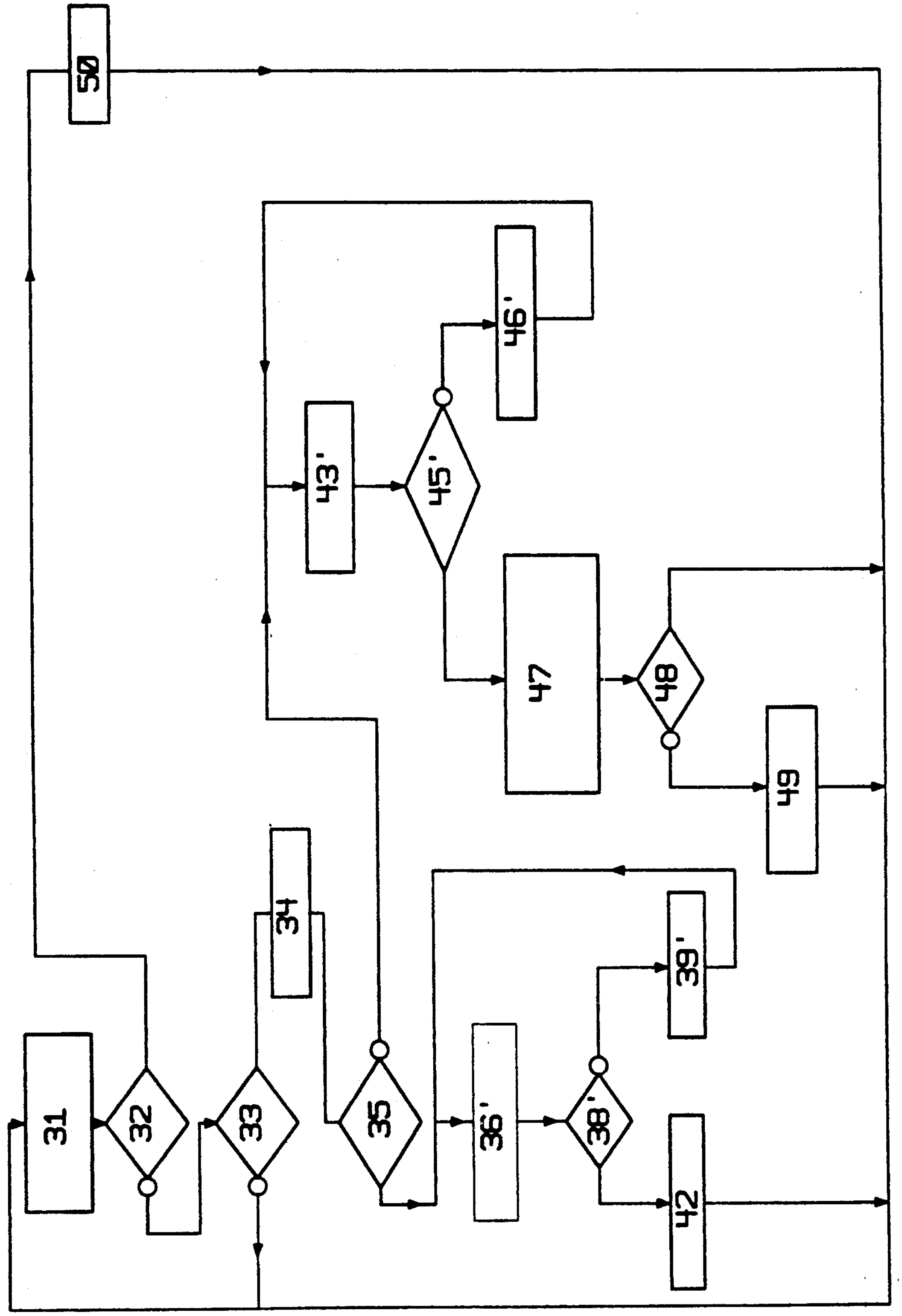
FIG. 10 shows a second, simplified embodiment of the safety program.

According to a simplified embodiment, it is considered sufficient to determine if the value of the signal received in operating mode is substantially equal to 0 while the corresponding value recorded in learning mode is different from 0, in order to activate an SPRG for stopping and raising the rolling shutter again. In this case, the signal generator 18 is constituted by a synchronous motor and the LPU 20 is programmed, when the rolling shutter is subjected to a Lowering command, to, sequentially and repetitively, read the value of the signal supplied by the synchronous motor, store this value when it is different from 0 or, the unit being in operating mode, the value being substantially equal to 0, activate the SPRG for stopping and raising the rolling shutter again if the last signal value recorded at that instant is different from the last signal value recorded in learning mode. In this case, it therefore suffices for the sensor 7 to supply a signal different from 0 when the rolling shutter is in motion. The flowchart corresponding to this simplified embodiment is shown in FIG. 10. Instructions 31 to 35, 42 and 47 to 50 are the same as in the embodiment shown in FIG. 5. Instructions 36, 37, 38 and 39 are replaced by instructions 36′, 38′ and 39′. Instructions 40 and 41 are eliminated. Instructions 43, 44, 45 and 46 are replaced by instructions 43′, 45′ and 46′. Instructions 36′ and 43′ are instructions for reading a speed value v respectively called by the test instruction 35 of the embodiment shown in FIG. 5. Instructions 38′ and 45′ are instructions for testing the value of the signal from the sensor 7. Instructions 39, and 46′ are instructions for storing the value of the signal, respectively in EEPROM and RAM memory. This embodiment operates as follows: instructions 31 to 35 run as in the embodiments shown in FIG. 5. In learning mode, instructions 36′, 38′ and 39′ run sequentially and repetitively as long as instruction 38′ tests that v is different from 0, that is to say as long as the rolling shutter 1 is moving. When the final slat 8 of the rolling shutter is immobilized, in this case when it is on the base of the opening, instruction 38, tests that v=0 and calls instruction 42, then the PRG runs as before according to FIG. 5.

In operating mode, instructions 43′, 45′ and 46′ run sequentially and repetitively, as long as instruction 45′ tests that the value of the signal from the sensor is different from 0, that is to say as long as the rolling shutter is not immobilized. In the case of an obstacle, the final slat 8 is stopped and instruction 45, then tests that the sensor signal is equal to 0 and calls instruction 47 which runs as in the preceding embodiment in FIG. 5.

This embodiment is less sensitive than the preceding embodiment, but has the advantage of a simpler program.

As in the first embodiment, the LPU 20 in this simplified embodiment, can be completed in such a way as to command the stopping of the rolling shutter at the end of travel in the low position, to stop the rolling shutter in the high position and to trigger an alarm in the case of an attempted break-in.

According to a first variant embodiment, the LPU 20 is programmed to activate an SPRG for stopping the rolling shutter in the learning mode, when the value of the signal read is equal to 0 and, in the operating mode, when the value of the signal is equal to 0 and the last value stored in operating mode is equal to the last value stored in learning mode. In this case, the program shown in FIG. 10 is completed by instructions 51 and 52 shown in FIG. 11, these instructions being respectively added after instructions 38' and 48.

When instruction 38, tests that v=0, it calls instruction 51 which actuates the SPRG for stopping the rolling shutter and, when instruction 48 tests that the last value stored in operating mode is equal to the last value stored in learning mode, it calls instruction 52 which actuates the SPRG for stopping the motor. As before, this variant allows the elimination of the automatic stop device for the low point.

Figure 12:
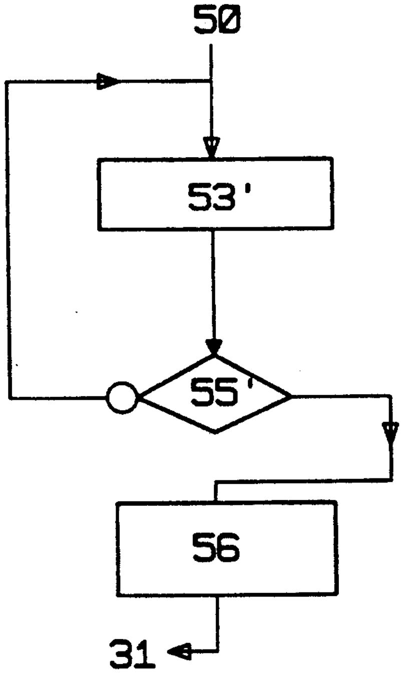
FIG. 12 shows a second addition to the program of FIG. 10 introducing instructions for the automatic stopping of the rolling shutter in the high position.

In order to eliminate the auxiliary automatic stop device completely, the program of FIG. 10 can be completed by the instructions shown in FIG. 12. In this case, the LPU 20 is furthermore programmed to, sequentially and repetitively, read a signal value from the sensor 7 corresponding to a speed v and to activate the SPRG for stopping the motor if v=0. Instructions 53' and 55' are added after instruction 50, as is instruction 56 already used in the variant according to FIG. 7. Instruction 53' is an instruction for reading a signal value v. Instruction 55' is an instruction for testing the value of the signal.

After the instruction 50 for activating the SPRG for Raising, instructions 53' and 55' run sequentially and repetitively as long as instruction 55' tests that v is different from 0. When instruction 55' tests that v=0, which corresponds either to the presence of an obstacle or to the high end of travel stop, it calls instruction 56 which activates the SPRG for stopping the motor.

Figure 13:
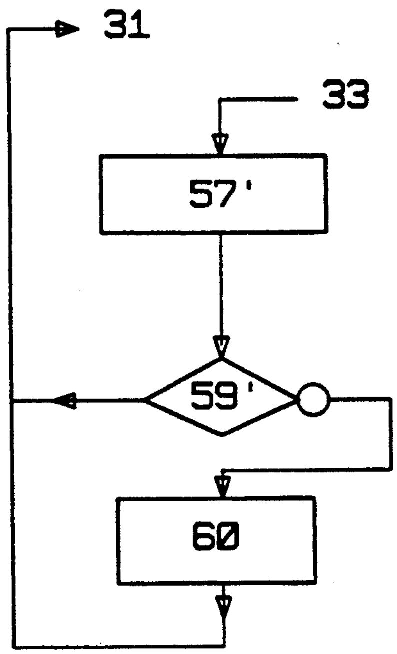
FIG. 13 shows a third addition to the program of FIG. 10 introducing instructions for triggering an alarm.

It is furthermore possible to program the LPU 20 in order to trigger an alarm. In this case the LPU reads a sensor signal value and activates the alarm SPRG in the case in which this value differs from 0, given that this value should normally be equal to 0, since the motor reduction gear is stopped. The program in FIG. 10 is completed as shown in FIG. 13. Instructions 57' and 59' are added to the test instruction 33, as is instruction 60 already used in the variant according to FIG. 8. Instruction 57' is an instruction for reading a value of v (speed) and instruction 59' is an instruction for testing the value of the signal from the sensor 7.

Instructions 57', 29', 31, 32 and 33 run sequentially and repetitively as long as neither of the contacts M or D are activated (tests 32 and 33) and as long as instruction 59' tests that v=0. If instruction 59' tests that v is different from 0, this means that the final slat 8 is stressed, it calls instruction 60 which activates the alarm SPRG.

Figure 14:
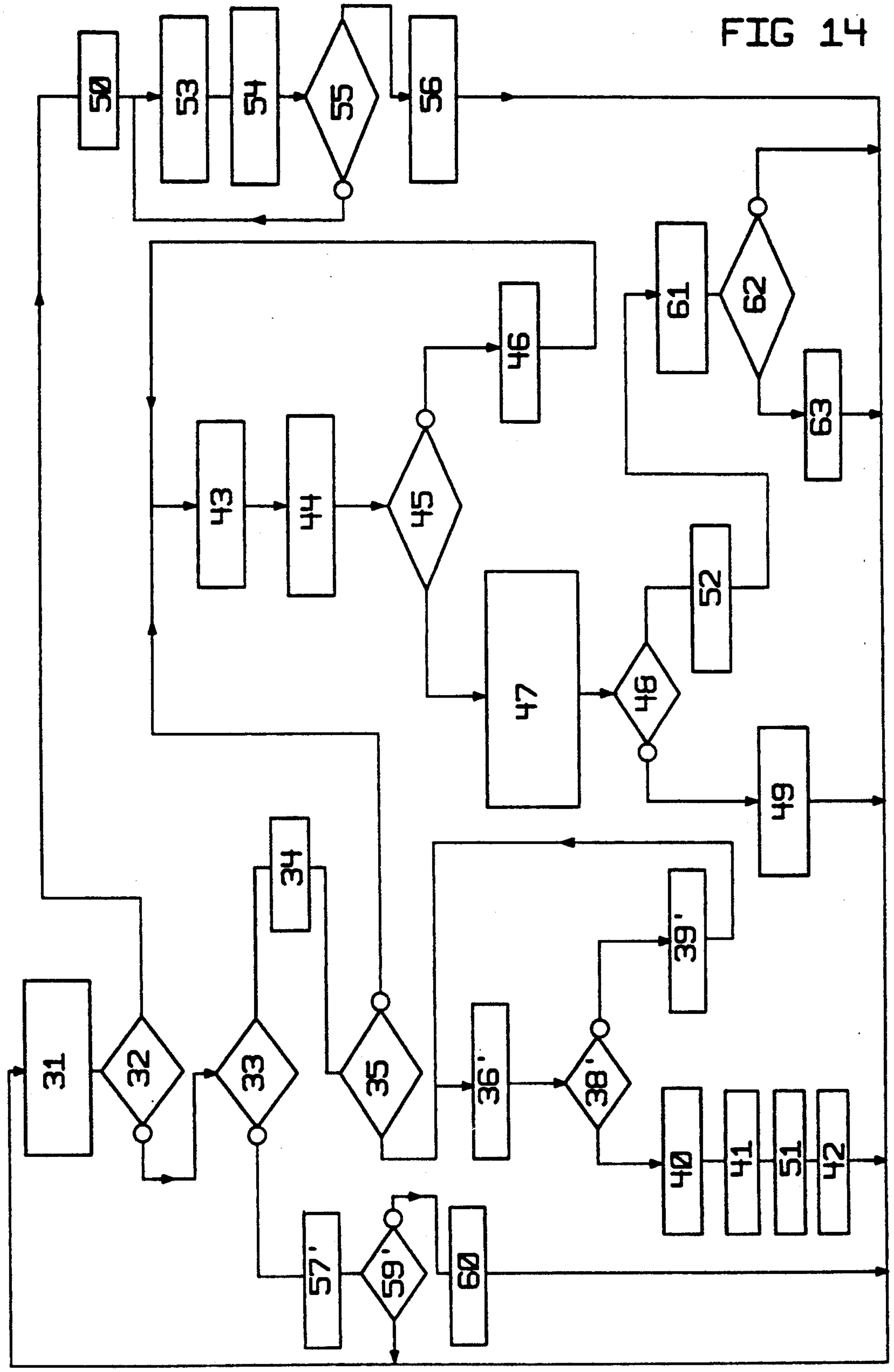
FIG. 14 shows a third embodiment of the safety program resulting from the combination of the first and second embodiments.

FIG. 14 shows the flowchart of a third embodiment combining the sensitivity of the first embodiment (FIG. 9) with the program simplicity of the second embodiment (FIG. 10). In operating mode, the measured speeds are directly compared with the speeds stored in learning mode. The speed of the pulley 13 being regularly decreasing, it is furthermore considered sufficient to compute the average slope by means of the first and the last speed value stored. For this purpose, the LPU 20 is programmed, in learning mode, to sequentially and repetitively, when the rolling shutter is subjected to a lowering command, read the value of a signal supplied by the asynchronous motor, store this value while the latter is different from 0 or, this value being equal to 0, compute the average slope between the first and the last stored value. The safety program shown in FIG. 14 being a combination of the programs shown in FIGS. 9 and 13, instructions 57', 59', 36', 38' and 39' of FIG. 13 replace instructions 57, 58, 59, 36, 37, 38 and 39 of the variant according to FIG. 9. With regard to the functioning, it is similar to the functioning of the variant according to FIG. 9 except with regard to instructions 36', 38' and 39' for which it is similar to the functioning of the variant shown in FIG. 13. While in the variant according to FIG. 9, in learning mode, the average slope is computed from the slopes computed between two consecutive signal samples, it is considered sufficient, as in the variant according to FIG. 13, to compute the average slope by means of the first and last recorded speed values (instructions 36', 38' and 40). Similarly, for the triggering of the alarm (instruction 60), it is considered sufficient to read the value of the speed signal (57') and the alarm is triggered when v is different from 0. On the other hand, for the automatic correction (instructions 43 to 63) the slope between two consecutive speed samples is computed first. This variant allows the combination of the sensitivity of the first embodiment with the simplicity of the program of the second embodiment.

In the case in which the logic processing unit is programmed to ensure the automatic stopping of the rolling shutter in the low position and in the case in which the automatic stopping of the rolling shutter is ensured by a mechanism driven with the winding tube and actuating an end of travel switch, it is not possible in practice to distinguish an obstacle from the low stop point if this obstacle is close to the low stop point and occupies a height of less than 20 mm above the low stop point. Therefore, in the case in which the automatic stopping at the low stop point is ensured by a mechanical device, such a small obstacle is ignored. This is particularly the case of a rolling shutter where the safety program tests that the speed in operating mode is equal to the speed in learning mode when the first slat of the rolling shutter butts on the base. The end of travel stop device will only ensure the stopping of the motor when all of the slats of the rolling shutter are stacked on top of each other. If the ignored small obstacle is, for example, a finger, particularly a child's finger, this finger can be jammed by the rolling shutter. If the stopping at the low point is ensured by the logic processing unit, the stopping at the low point will take place sooner and the rolling shutter will not be completely closed.

It is possible to overcome this disadvantage as follows:

The logic processing unit is furthermore programmed to, in learning mode, as long as the elementary slope of the curve of the samples is equal to zero or when the value of the samples is equal to zero, according to the embodiment, compute the average of the last n sample values stored and, in operating mode, when the difference between the elementary slope between the signal samples and the average slope computed in learning mode is greater than a predetermined value or when the value of the sample is close to zero, according to the embodiment, compute the average of the last n sample values stored and compare this average with the average of the last n values of the signal samples computed in learning mode and activate the motor stopping and shutter raising subroutine when the difference between the compared values is greater than a predetermined value.

In practice n will be chosen to be approximately equal to 20 and the critical difference will be chosen to be approximately 10% of the average value computed in learning mode.

This improvement of the program allows the detection of obstacles occupying a height of approximately 5 mm above the low stop point. A rolling shutter encountering a finger will stop and rise again.

Figure 5:
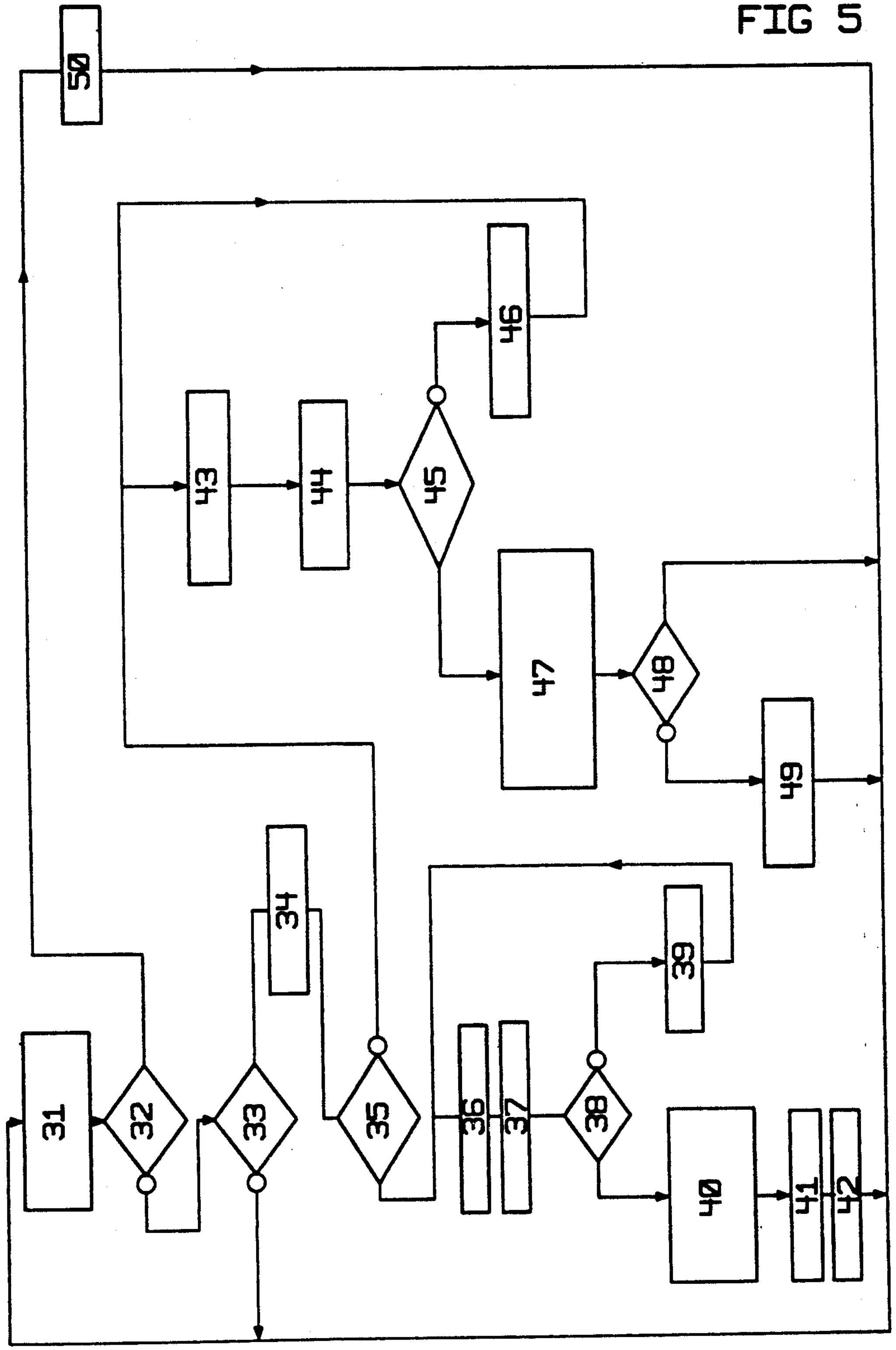
FIG. 5 shows the flowchart of the safety program according to a basic embodiment of the safety device with no stopping at the end of travel.
Figure 6:
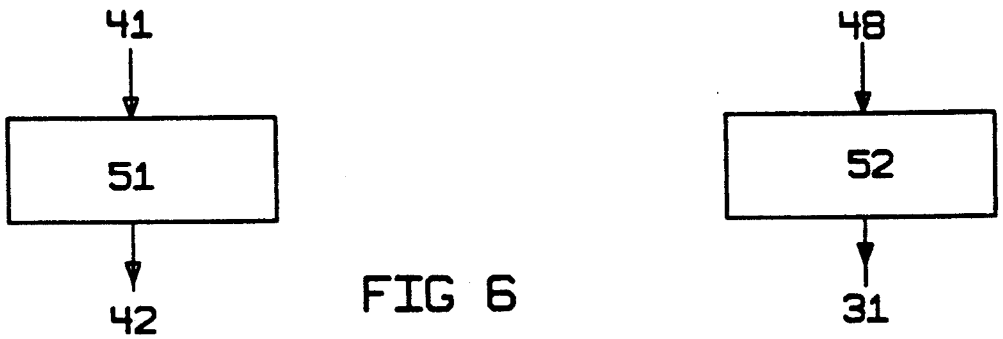
FIG. 6 shows a first element of the program of FIG. 5, for stopping the motor at the end of travel, in the low position.
Figure 15:
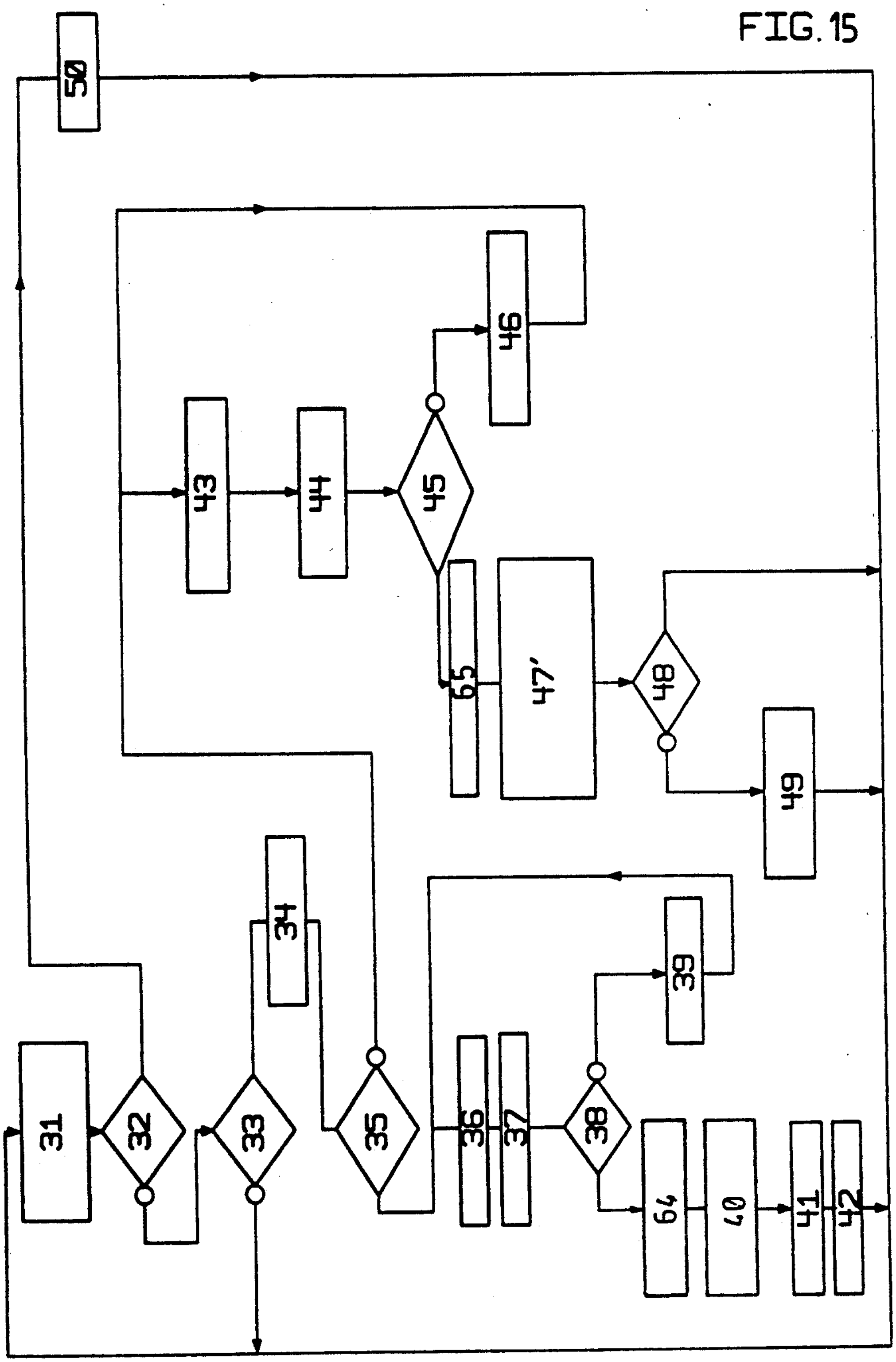
FIG. 15 shows the flowchart of FIG. 5 completed so that it can distinguish an obstacle slightly higher than the low stop point.
Figure 16:
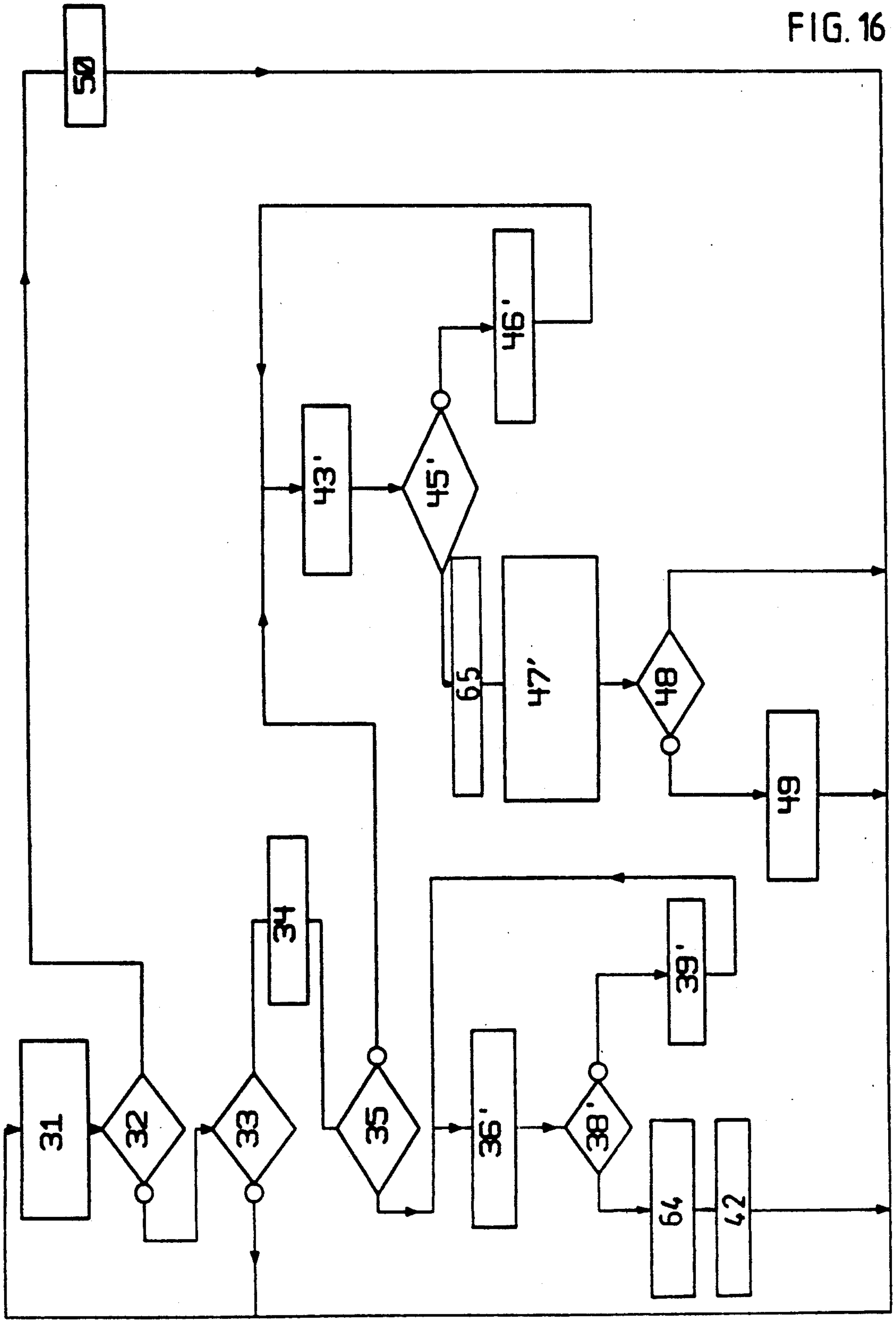
FIG. 16 shows the diagram of FIG. 10 completed for the same purpose as FIG. 15.
Figure 17:
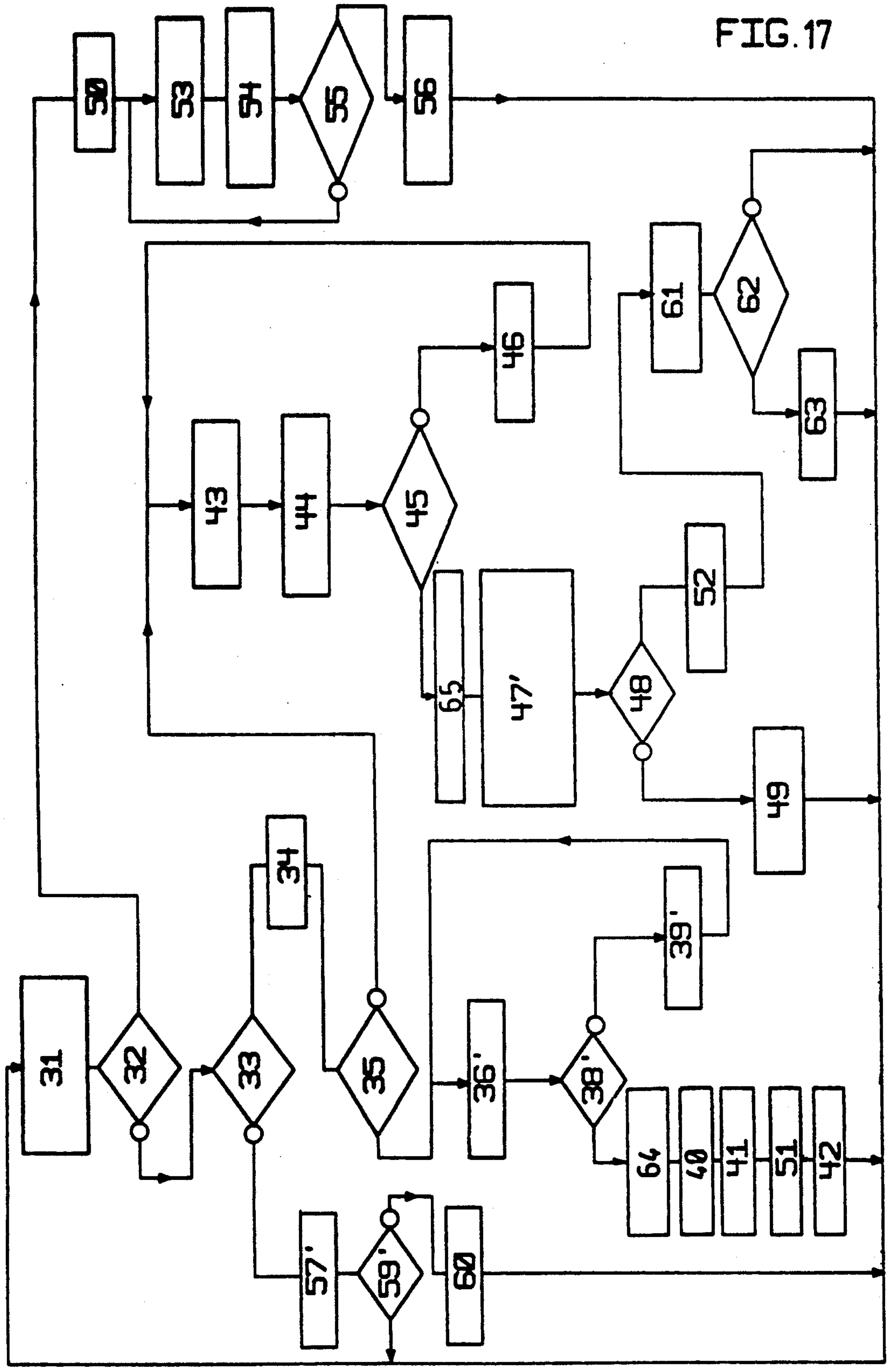
FIG. 17 shows the diagram of FIG. 14 completed for the same purpose as FIG. 15.

FIGS. 15, 16 and 17 respectively show the flowcharts of the safety programs according to FIGS. 5, 10 and 14 completed as mentioned above.

The flowchart shown in FIG. 15 corresponds to the flowchart shown in FIG. 5, to which the instructions 64 and 65 have been added. Instruction 64, between the test instruction 38 and instruction 40, is an instruction for computing the average value (VMAP) of the last n values read in learning mode and stored in 39.

Instruction 65, disposed between the test instruction 45 and instruction 47', is an instruction for computing the average value (VMUT) of the last n values read in operating mode and stored in 46.

Instruction 47 of the main patent application has become instruction 47' because, in this new embodiment, it is an instruction for comparing the last average value VMUT computed with the last stored average VMAP. Consequently, instruction 48 tests if VMUT≈VMAP.

In practice, n≈20 and instruction 48 detects VMUT=VMAP for VMUT≧0.9 VMAP.

If instruction 48 detects VMUT≠VMAP, that is to say VMUT<0.9 VMAP, instruction 48 calls instruction 49 which activates the subroutine for stopping and raising the rolling shutter.

The logic processing unit can of course furthermore be programmed to provide the previously described additional functions.

FIG. 16 shows the flowchart of FIG. 10 completed by the same instructions 64 and 65. Instruction 64 is disposed between the test instruction 38' and instruction 42. Instruction 65 is disposed between the test instruction 45' and instruction 47' identical to instruction 47' in FIG. 15.

The flowchart shown in FIG. 17 corresponds to the flowchart shown in FIG. 14 completed by the same instructions 64 and 65. Instruction 64 is disposed between the test instruction 48' and instruction 40. Instruction 65 is disposed between the test instruction 45 and instruction 47' identical to instruction 47' in FIG. 15.

I claim:

1. A safety device for a motorized rolling shutter (1) or similar comprising means (7) supplying an electrical signal representing the displacement of the rolling shutter (1) and a logic processing unit (20) capable of working in learning mode and in operating mode, by sampling, and comprising means (29) of storing, in learning mode, value samples corresponding to the signal samples and means (27) of comparing, in operating mode, these stored value samples with value samples obtained in operating mode, and means (20, 25) of controlling a stopping of the motor of the rolling shutter when a difference between the value of the sample obtained in operating mode and the value of the stored sample is greater than a predetermined difference, wherein the means supplying the electrical signal representing the displacement of the rolling shutter comprise a pulley (13) on which is wound a flexible element (9) whose free end is connected to the end of the rolling shutter (1) such that the unrolling of the rolling shutter causes the unrolling of the flexible element, an elastic means (14, 15) ensuring the rewinding of the flexible element on its pulley during the rolling of the rolling shutter and a signal generator (18; 30) mechanically connected to a spindle of the pulley and supplying an electrical voltage representing the speed of rotation of the pulley, and wherein the logic processing unit (20) comprises means of sampling the electrical signal supplied by the signal generator.

2. The device as claimed in claim 1, wherein the signal generator is a synchronous motor (18) driven by the shaft of the pulley.

3. The device as claimed in claim 2, wherein the logic processing unit is programmed to, in learning mode, when the rolling shutter is subjected to a lowering command, store the samples as long as they are different from 0 and, in operating mode, activate a subroutine for stopping the motor and raising the shutter when the value of the sample is close to 0 and different from the last value stored in learning mode (FIG. 10).

Figure 11:
FIG. 11 shows a first addition to the program of FIG. 10 ensuring the automatic stop function at the end of travel in the low position.

4. The device as claimed in claim 3, wherein the logic unit is furthermore programmed to, in learning mode, activate a subroutine for stopping the motor when the value of the signal sample is equal to 0 and, in operating mode, activate the subroutine for stopping the motor when the value of the signal sample is equal to 0 and substantially equal to the last value stored in learning mode (FIG. 11).

5. The device as claimed in claim 4, wherein, in the case in which the rolling shutter is subjected to a raising command, the logic unit is furthermore programmed to activate a subroutine for stopping the motor when the value of the signal sample is equal to 0 (FIG. 12).

6. The device as claimed in any one of claims 3, 4 or 5, wherein, in the case in which the rolling shutter is not subjected to any displacement command, the logic processing unit is furthermore programmed to activate an alarm subroutine when the value of the signal sample is different from 0 (FIG. 13).

7. The device as claimed in claim 3, wherein the logic processing unit is furthermore programmed to, in learning mode, when the value of the samples is equal to zero, compute a first average of a number of sample values stored and, in operating mode, when the value of the sample is close to zero, compute a second average of a number of last sample values stored, and then compare this second average with the first average and activate the subroutine for stopping the motor and raising the shutter when the difference between the compared values is greater than a predetermined value.

8. The device as claimed in claim 2, wherein the logic processing unit is programmed, in learning mode, when the rolling shutter is subjected to a lowering command, to store the value of the signal samples when it is different from 0 and, if this value is equal to 0, to compute an average slope of the curve of the samples as a function of time by means of the first and last stored values and, in operating mode, to read the signal samples, calculate an elementary slope between the samples, compare this elementary slope with the stored average slope and activate a subroutine for stopping the motor and raising the shutter when the difference between the computed elementary slope and the average slope is greater than a predetermined value (FIG. 14).

9. The device as claimed in claim 8, wherein the logic processing unit is furthermore programmed to, in learning mode, activate a subroutine for stopping the motor when the value of the signal sample is equal to 0 and, in operating mode, to activate the subroutine for stopping the motor when the value of the last sample is equal to the value of the last sample stored in learning mode (FIG. 14: 51, 52).

10. The device as claimed in claim 9, wherein, in the case in which the rolling shutter is subjected to a raising command, the logic processing unit is furthermore programmed to compute the elementary slope between the consecutive signal samples and to activate a subroutine for stopping the motor when the difference between this elementary slope and the average slope computed in learning mode is greater than a predetermined value (FIG. 14: 50 through 56).

11. The device as claimed in any one of claims 8, 9 or 10, wherein, in the case in which the rolling shutter is not subjected to any displacement command, the logic processing unit is furthermore programmed to activate an alarm subroutine when the value of the signal sample is different from 0 (FIGS. 14: 57', 59', 60).

12. The device as claimed in claim 11 wherein the logic processing unit is further programmed to, when the last signal sample recorded in operating mode is equal to the last signal sample recorded in learning mode, compute the average slope of the curve of the samples between the first and last signal values, compare this average slope with the average slope previously computed in learning mode and store and replace this stored average slope with the new average slope and the values of the samples corresponding to this new slope, if the difference between the two compared average slopes is greater than a predetermined value.

13. The device as claimed in any one of claims 9 or 10 wherein the logic processing unit is furthermore programmed to, when the last signal sample recorded in operating mode is equal to the last signal sample recorded in learning mode, compute the average slope of the curve of the samples between the first and last signal values, compare this average slope with the average slope previously computed in learning mode and store and replace this stored average slope with the new average slop and the values of the samples corresponding to this new slope, if the difference between the two compared average slopes is greater than a predetermined value (FIG. 14: 52, 61, 62, 63).

14. The device as claimed in claim 8, wherein the logic processing unit is furthermore programmed to, in learning mode, when the value of the samples is equal to zero, compute the average of a number of last sample values stored and, in operating mode, when the difference between the elementary slope between the signal samples and the average slope computed in learning mode is greater than a predetermined value, compute the average of a number of last sample values stored, and then compare this average with the average of the number of last sample values of the signal samples computed in learning mode, and activate the subroutine for stopping the motor and raising the shutter when the difference between the compared values is greater than a predetermined value.

15. The device as claimed in claim 1, wherein the logic processing unit (20) is programmed to, in learning mode, when the rolling shutter is subjected to a lowering command, read the signal samples, compute the difference between the consecutive samples, this difference corresponding to a elementary slope of the curve of the samples as a function of time, store these samples as long as the computed elementary slope is different from 0, and compute and store a average slope between the first and last signal samples and, in operating mode, read the signal samples, compute the elementary slope between the samples, compare this elementary slope with the average slope computed in learning mode, and activate a subroutine for stopping a motor and raising the shutter, when the difference between this elementary slope and said average slope is greater than a predetermined value (FIG. 5).

16. The device as claimed in claim 15, wherein the logic unit is furthermore programmed to, in learning mode, activate a subroutine for stopping the motor of the rolling shutter when the computed elementary slope is equal to 0 and, in operating mode, activate the stop subroutine when the value of the last sample is equal to the value of the last sample stored in learning mode (FIG. 6).

17. The device as claimed in claim 16, wherein, in the case in which the rolling shutter is subjected to a raising command, the logic unit is furthermore programmed to compute the elementary slope between the consecutive signal samples and to activate a subroutine for stopping the motor when the difference between this elementary slope and the average slope computed in learning mode is greater than a predetermined value (FIG. 7).

18. The device as claimed in claim 15, wherein the logic processing unit is furthermore programmed to, in learning mode, when the elementary slope of the curve of the samples is equal to zero, compute the average of a number of last sample values stored before computing the average slope between the first and last signal samples and, in operating mode, when the difference between the elementary slope between the signal samples and the average slope computed in learning mode is greater than a predetermined value, compute the average of the last n signal sample values stored, and then compare this average with the average of the number of last sample values of the signal samples computed in learning mode and activate the subroutine for stopping the motor and raising the shutter when the difference between the compared values is greater than a predetermined value.

19. The device as claimed in any one of claims 15, 16, or, wherein the logic unit is furthermore programmed to, when the last signal sample recorded in operating mode is equal to the last signal sample recorded in learning mode, compute the average slope of the curve of the samples between the first and last signal samples, to compare this average slope with the average slope previously computed in learning mode and to store and replace this stored average slope with the new average slope and the values of the samples corresponding to this new slope, if the difference between the two compared average slopes is greater than a predetermined value (FIG. 9).

20. The device as claimed in any one of claims 15, 16, or 17, wherein in the case in which the rolling shutter is not subjected to any displacement command, the logic unit is furthermore programmed to compute the elementary slope between the consecutive samples and to actuate an alarm subroutine when this elementary slope is different from 0 (FIG. 8).

21. The device as claimed in claim 20, wherein the logic unit is further programmed to, when the last signal sample recorded in operating mode is equal to the last signal sample recorded in learning mode, compute the average slope of the curve of the samples between the first and last signal samples, to compare this average slope with the average slope previously computed in learning mode and to store and replace this stored average slope with the new average slope and the values of the samples corresponding to this new slope, if the difference between the two compared average slopes is greater than a predetermined value.

22. The device as claimed in claim 1, wherein the signal generator is a strain gage (30) associated with the elastic means (15) of rewinding the flexible element (9).

* * * * *